US012706663B2

(12) United States Patent
Yang et al.

(10) Patent No.: US 12,706,663 B2
(45) Date of Patent: Aug. 11, 2026

(54) TRIGGERING RELAY TRANSMISSION USING A PHYSICAL DOWNLINK SHARED CHANNEL

(71) Applicant: QUALCOMM Incorporated, San Diego, CA (US)

(72) Inventors: Luanxia Yang, Beijing (CN); Jing Sun, San Diego, CA (US); Changlong Xu, Beijing (CN); Xiaoxia Zhang, San Diego, CA (US); Rajat Prakash, San Diego, CA (US); Hao Xu, Beijing (CN); Shaozhen Guo, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/263,978

(22) PCT Filed: Apr. 19, 2021

(86) PCT No.: PCT/CN2021/088043

§ 371 (c)(1),
(2) Date: Aug. 2, 2023

(87) PCT Pub. No.: WO2022/221981

PCT Pub. Date: Oct. 27, 2022

(65) Prior Publication Data

US 2024/0305358 A1 Sep. 12, 2024

(51) Int. Cl.
*H04B 7/155* (2006.01)
*H04L 5/00* (2006.01)

(52) U.S. Cl.
CPC ....... *H04B 7/15542* (2013.01); *H04L 5/0053* (2013.01)

(58) Field of Classification Search
CPC .. H04B 7/15542; H04L 5/0053; H04L 5/0044
See application file for complete search history.

(56) References Cited

U.S. PATENT DOCUMENTS 10,512,075 B2 12/2019 John Wilson et al.
2010/0150173 A1* 6/2010 Yu ...................... H04B 7/15528 370/474

(Continued)

FOREIGN PATENT DOCUMENTS

WO 2018144168 8/2018

OTHER PUBLICATIONS

International Search Report and Written Opinion—PCT/CN2021/088043—ISA/EPO—Oct. 15, 2021.

(Continued)

*Primary Examiner* — Hashim S Bhatti
(74) *Attorney, Agent, or Firm* — Polsinelli LLP

(57) ABSTRACT

Disclosed are systems and techniques for wireless communications. For instance, a wireless relay device can receive a first Physical Downlink Shared Channel (PDSCH) communication and determine, from the PDSCH communication, a first combined transport block including a plurality of components, the plurality of components including a first control component associated with a first user equipment (UE). The relay device can generate a first transport block that includes the first control component and transmit the first transport block.

29 Claims, 8 Drawing Sheets

(56) References Cited

U.S. PATENT DOCUMENTS

| | | | | |
|---|---|---|---|---|
| 2011/0075684 | A1* | 3/2011 | Zeng | H04L 1/1861 370/475 |
| 2013/0128857 | A1* | 5/2013 | Nakao | H04L 5/0094 370/329 |
| 2019/0159277 | A1* | 5/2019 | Zhu | H04L 45/16 |
| 2019/0349130 | A1* | 11/2019 | Khoshnevisan | H04L 1/0009 |
| 2020/0107368 | A1 | 4/2020 | Zhou et al. | |
| 2021/0105062 | A1 | 4/2021 | Abedini et al. | |
| 2021/0127389 | A1* | 4/2021 | Liu | H04W 72/0446 |
| 2021/0127396 | A1* | 4/2021 | Su | H04L 5/0094 |
| 2024/0097858 | A1* | 3/2024 | Liu | H04W 72/25 |

OTHER PUBLICATIONS

ZTE: “Backhaul Link Packet Aggregated Transmission”, 3GPP Draft, TSG-RAN WG1 #58, R1-093202 Packet Aggregation, 3rd Generation Partnership Project (3GPP), Mobile Competence Centre, 650, Route Des Lucioles, F-06921 Sophia-Antipolis Cedex, France, No. Shenzhen, China, Aug. 24-28, 2009, 5 Pages, Aug. 19, 2009, Aug. 19, 2009 (Aug. 19, 2009), XP050351555, [retrieved on Aug. 19, 2009] the whole document.

* cited by examiner

500
H1
502
H2
504
H3
506
Component TB1
508
Component TB2
510
Component TB3
512
H3'
514
Component TB3'
516

700

Generate A Combined Transport Block Including A Plurality Of Components And Routing Information Indicating At Least One Route Associated With A First User Equipment (UE)
702

Transmit The Combined Transport Block In A Physical Downlink Shared Channel (PDSCH) Communication
704

TRIGGERING RELAY TRANSMISSION USING A PHYSICAL DOWNLINK SHARED CHANNEL

FIELD OF THE DISCLOSURE

The present disclosure generally relates to wireless communications. Aspects of the disclosure relate to systems and techniques for triggering relay transmission using the Physical Downlink Shared Channel (PDSCH).

BACKGROUND OF THE DISCLOSURE

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards. Aspects of 5G mobile communications may support direct communications between devices, which may be referred to as sidelink communications. Sidelink can also be referred to as PC5. Wi-Fi also includes a protocol for direct device-to-device communications, referred to as a Dedicated Short Range Communication (DSRC) protocol.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, a method of performing wireless communications is provided. The method includes: receiving a first Physical Downlink Shared Channel communication; determining, from the first PDSCH communication, a first combined transport block including a plurality of components, the plurality of components including a first control component associated with a first user equipment; generating a first transport block that includes the first control component; and transmitting the first transport block.

In another example, an apparatus for wireless communications is provided that includes at least one memory, at least one transceiver, and at least one processor (e.g., implemented in circuitry) coupled to the at least one memory and the at least one transceiver. The at least one processor is configured to: receive, via the at least one transceiver, a first Physical Downlink Shared Channel communication; determine, from the first PDSCH communication, a first combined transport block including a plurality of components, the plurality of components including a first control component associated with a first user equipment; generate a first transport block that includes the first control component; and transmit, via the at least one transceiver, the first transport block.

In another example, a non-transitory computer-readable medium is provided for performing wireless communications, which has stored thereon instructions that, when executed by one or more processors, cause the one or more processors to: receive a first Physical Downlink Shared Channel communication; determine, from the first PDSCH communication, a first combined transport block including a plurality of components, the plurality of components including a first control component associated with a first user equipment; generate a first transport block that includes the first control component; and transmit the first transport block.

In another example, an apparatus for wireless communications is provided. The apparatus includes: means for receiving a first Physical Downlink Shared Channel communication; means for determining, from the first PDSCH communication, a first combined transport block including a plurality of components, the plurality of components including a first control component associated with a first user equipment; means for generating a first transport block that includes the first control component; and means for transmitting the first transport block.

In another illustrative example, a method of performing wireless communications is provided. The method includes: generating a combined transport block including a plurality of components and routing information indicating at least one route associated with a first user equipment; and transmitting the combined transport block in a Physical Downlink Shared Channel (PDSCH) communication.

In another example, an apparatus for wireless communications is provided that includes at least one memory, at least one transceiver, and at least one processor (e.g., implemented in circuitry) coupled to the at least one memory and the at least one transceiver. The at least one processor is configured to: generate a combined transport block including a plurality of components and routing information indicating at least one route associated with a first user equipment; and transmit, via the at least one transceiver, the combined transport block in a Physical Downlink Shared Channel (PDSCH) communication.

In another example, a non-transitory computer-readable medium is provided for performing wireless communications, which has stored thereon instructions that, when executed by one or more processors, cause the one or more processors to: generate a combined transport block including a plurality of components and routing information indicating at least one route associated with a first user equipment; and transmit the combined transport block in a Physical Downlink Shared Channel (PDSCH) communication.

In another example, an apparatus for performing sidelink communications is provided. The apparatus includes: means for generating a combined transport block including a plurality of components and routing information indicating at least one route associated with a first user equipment; and means for transmitting the combined transport block in a Physical Downlink Shared Channel (PDSCH) communication.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device having a radio frequency (RF) interface. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided for illustration of the aspects and not limitation thereof.

DETAILED DESCRIPTION

Figure 1:
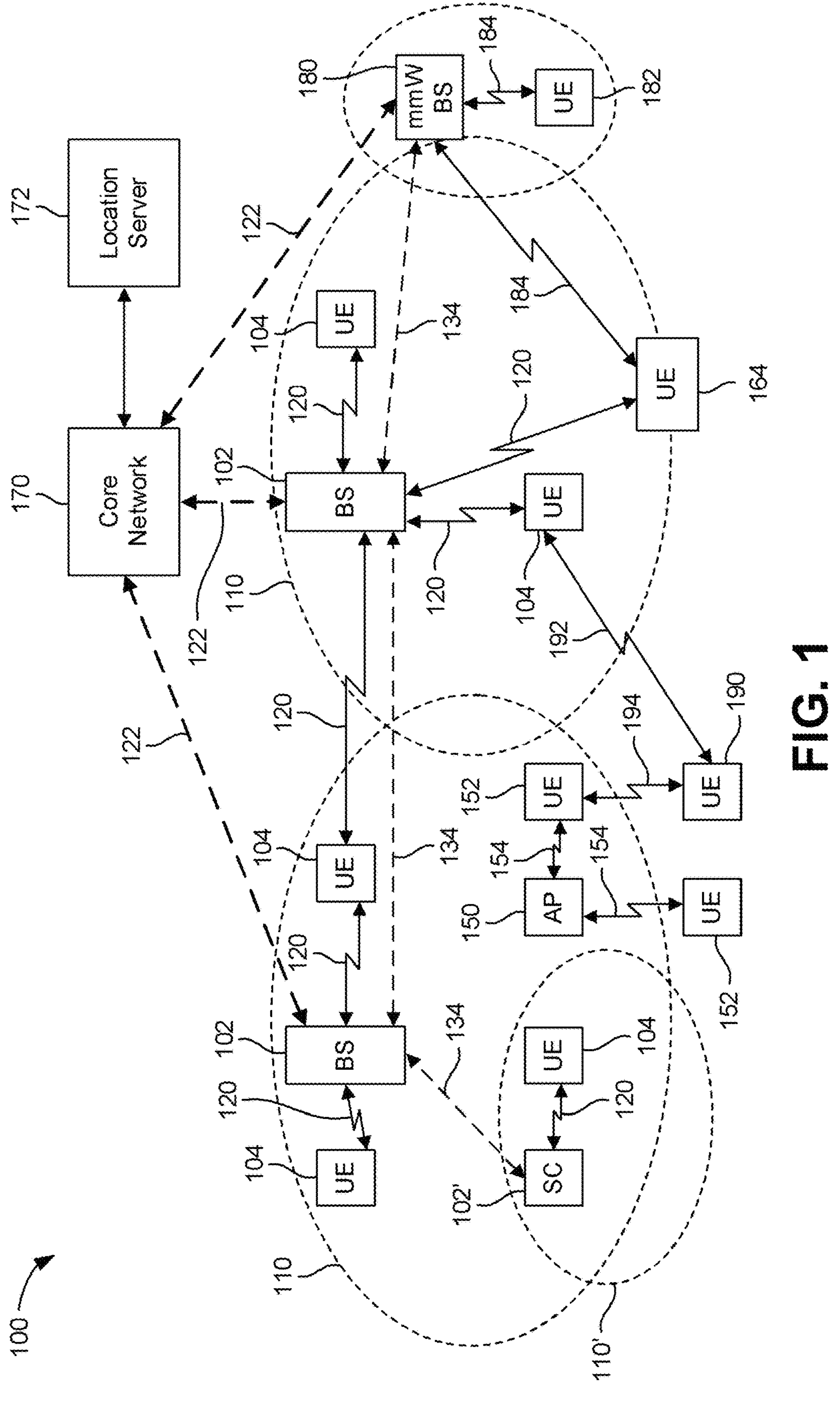
FIG. 1 is a block diagram illustrating an example of a wireless communication network, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Wireless communication networks are deployed to provide various communication services, such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station). In one example, an access link between a UE and a 3GPP gNB can be over a Uu interface. In some cases, an access link may support uplink signaling, downlink signaling, connection procedures, etc.

A sidelink may refer to any communication link between client devices (e.g., UEs, STAs, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 gigahertz (GHz) or 6 GHZ). As used herein, the term sidelink can refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some instances, a client device may have little or no connectivity to a base station. For example, the client device may be outside or on the fringe of a coverage area supported by the base station, which can result in poor signal quality for access links between the client device and the base station. Although connectivity to a base station may be limited, such a client device may be able to communicate with one or more other client devices using sidelink communications.

In some examples, a wireless device (e.g., a UE, a STA, or other device) can be configured to operate as a relay device in order to provide connectivity between a base station and other wireless devices. However, increasing the number of wireless devices that are associated with a base station (e.g., either directly or through relay devices) consumes a greater number of resources (e.g., control and data signaling). For example, a base station that serves an increased number of UEs may not have sufficient resources to send control information to all UEs using Physical Downlink Control Channel (PDCCH) communications. As a result, uplink and/or downlink grants may be delayed for some UEs. In addition, a base station serving a large number of UEs may be required to transmit an increased number of PDCCH communications, which can result in degraded performance (e.g., increased power consumption, reduced processing capabilities, etc.) by UEs that are required to decode the additional PDCCH communications. As further discussed herein, a base station may use the Physical Downlink Shared Channel (PDSCH) to communicate with other wireless devices (e.g., send control information) and trigger relay sidelink transmissions.

Systems, apparatuses, processes (also referred to as methods), and computer-readable media (collectively referred to as "systems and techniques") are described herein for performing wireless communications and triggering relay sidelink transmissions using the Physical Downlink Shared Channel (PDSCH). The systems and techniques provide the ability for a base station (e.g., a gNB, eNB, etc.) to communicate with client devices (e.g., UEs) through one or more other wireless relay devices (e.g., UEs, small cell base stations such as femtocells, picocells, microcells, etc.) that are configured to perform relay routing using sidelink communications, such as using a PC5 sidelink interface according to LTE, 5G, etc., Wi-Fi direct communication protocols (e.g., DSRC protocol), or using any other device-to-device communication protocol.

In some aspects, relay devices can be configured to transmit and receive data and/or control information between UEs and base stations to facilitate uplink communications, downlink communications, or both. For example, a relay device can receive a Physical Downlink Shared Channel (PDSCH) communication from the base station (e.g., via a downlink transmission) or from another relay device (e.g., via a sidelink transmission). Based on the PDSCH communication, the relay device can determine or generate a combined transport block.

In some cases, the combined transport block can include a plurality of components (e.g., control components, data components, Downlink Control Information (DCI) components, etc.) that are directed from the base station to a UE. In some examples, the relay device can determine or generate a new transport block that includes control and/or data components associated with the UE. The relay device can transmit the new transport block (e.g., to another relay or to the UE). In some cases, the transmission by the relay device can be performed using a sidelink transmission. The sidelink transmission can include a PDSCH communication (e.g., to another relay device) or a PDCCH communication (e.g., to the UE). A relay device can be a UE, a small cell base station, or any other wireless device that can transmit and receive communications.

In some examples, the combined transport block can include one or more headers or other fields that can include information. The one or more headers (or other fields) can include information such as a destination identifier (e.g., an identifier of a UE, referred to as a UE identifier), routing information (e.g., identifying one or more nodes in a path or route to one or more UEs), range identification information (e.g., identifying a range of time and/or frequency resources associated with one or more components), transmission resource allocation information, any combination thereof, and/or other information. The transmission resource allocation information can include a resource allocation for a relay to transmit to one or more other relays, a resource allocation for the relay to transmit to one or more UEs, a resource allocation for the relay to send a broadcast communication, a resource allocation for the UE to transmit to one or more relays, a resource allocation for the UE to transmit to base station, etc. In some cases, one or more of the headers (or other fields) can be encoded with the payload portion (e.g., data components and/or control components) of the combined transport block.

In some aspects, a relay device can obtain routing information (e.g., from a header or other field, as noted above) associated with control components and/or data components in a combined transport block. Based on the routing information, the relay device can identify one or more nodes that are part of a route or path to the UE that is associated with at least a portion of the components in the combined transport block. In some cases, the relay device can generate a new combined transport block. The relay device can send the new combined transport block to one or more of the nodes that are part of the route to the UE.

In another example, a base station can be configured to generate a combined transport block that can include a plurality of components and routing information indicating at least one route or path associated with a UE. For instance, the base station can identify one or more nodes that are part of a route to a UE that is associated with the base station through one or more relays. In some examples, the plurality of components can correspond to control components and/or data components that are directed to the UE. The control components and/or data components for the UE can be encoded as part of the combined transport block that can be transmitted by the base station using a PDSCH communication. In some cases, the base station can transmit the combined transport block to one or more nodes (e.g., relay devices) that are part of the at least one route associated with the UE.

In some aspects, a base station may receive a feedback message from a relay device with an indication of a failure to decode at least one component from the plurality of components in the combined transport block. In some cases, the failed component can correspond to a data component and the base station can transmit another copy of the data component to the relay device. In another example, the failed component can correspond to a control component and, in response, the base station can determine new control information and send new control components to the relay device. In some aspects, the new control components can be transmitted as part of a new combined transport block that includes another copy of data components that are allocated in resources that are identified by the new control information in the new control components.

In some examples, the combined transport block generated by the base station can include one or more headers. The one or more headers can include information such as a destination identifier, routing information, range identification, transmission resource allocation, and/or any combination thereof. In some cases, the information is contained on at least two different headers. In some aspects, one or more of the header can be encoded together with one or more of the data components and/or control components in the combined transport block (e.g., encoded with a payload).

Various aspects of the techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various user equipment devices (UEs) 104. As used herein, the term "UE" may be referred to interchangeably as an "access terminal" or "AT," a "user device," a "user terminal" or UT, a "client device," a "wireless device," a "subscriber device," a "subscriber terminal," a "subscriber station," a "mobile device," a "mobile terminal," a "mobile station," or variations thereof.

The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 (e.g., access links) between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAS 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies can be referred to as the FR2 band (e.g., including a frequency range of 24250 MHz to 52600 MHZ). In some examples, the wireless communications system 100 can include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that can be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connect indirectly to one or more communication networks via one or more relay devices (e.g., UEs) by using device-to-device (D2D) peer-to-peer (P2P) links (referred to as "sidelinks"). In the example of FIG. 1, UE 190 has a D2D P2P link 192 with one of the UEs 104, which can be configured to operate as a relay device (e.g., through which UE 190 may indirectly communicate with base station 102). In another example, UE 190 also has a D2D P2P link 194 with WLAN STA 152, which is connected to the WLAN AP 150 and can be configured to operate as a relay device (e.g., UE 190 may indirectly communicate with AP 150). In an example, the D2D P2P links 192 and 194 may be supported with any well-known D2D RAT, such as LTE Direct (LTE-D), Wi-Fi Direct (Wi-Fi-D), Bluetooth®, UWB, and so on.

As noted above, base station 102 can communicate with UE 190 through UE 104, which can be configured to operate as a relay device. In some examples, base station 102 can generate a combined transport block that includes control components and/or data components that are directed to UE 190. In some aspects, base station 102 can send the combined transport block to UE 104 in a Physical Downlink Shared Channel (PDSCH) communication. In some cases, UE 104 can process the combined transport block and send associated control components and/or data components to UE 190 using a sidelink transmission (e.g., D2D P2P link 192). Further details regarding wireless communications among base station 102, relay devices (e.g., UE 104) and UEs (e.g., UE 190) are provided herein.

Figure 2:
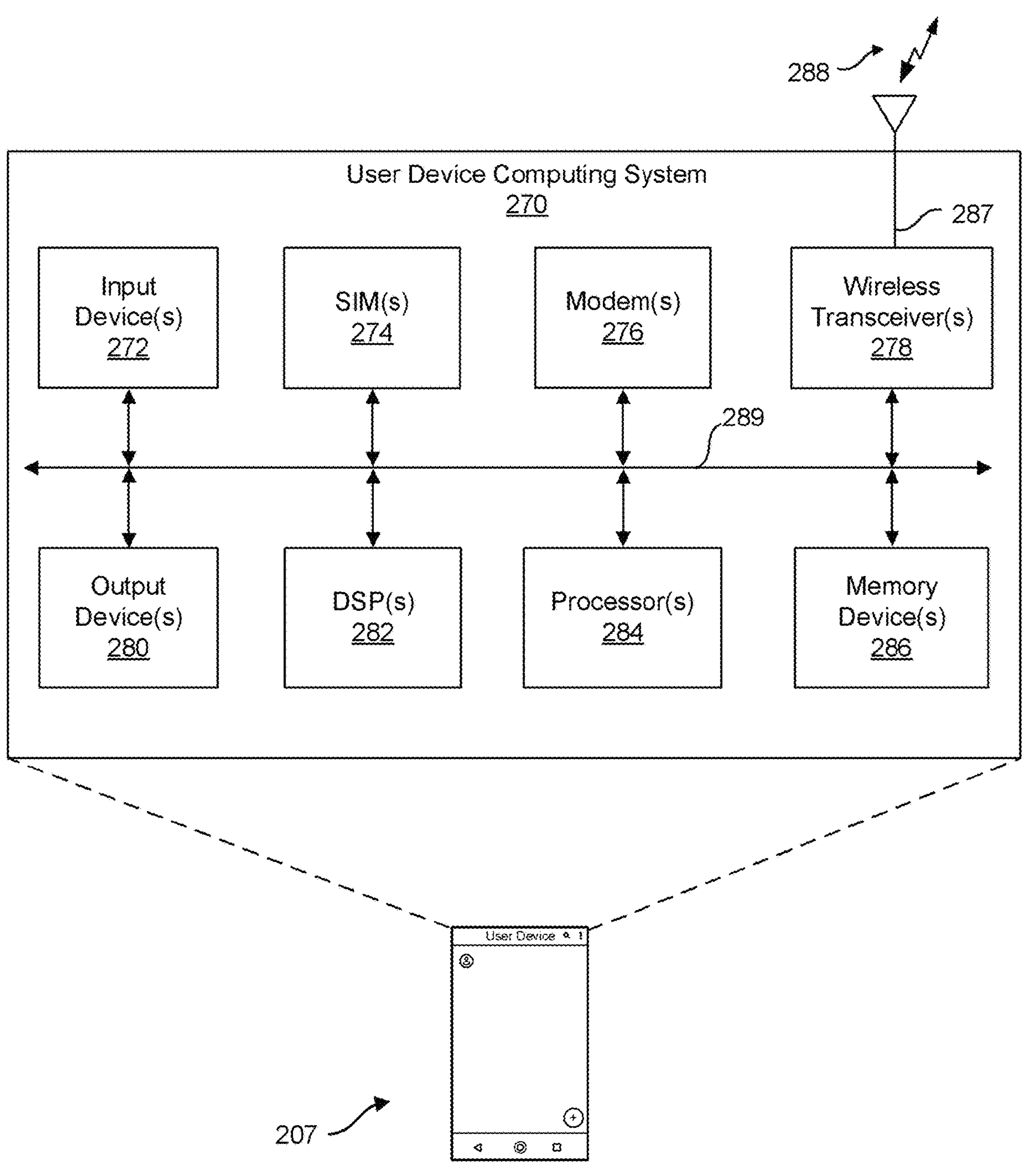
FIG. 2 is a block diagram illustrating an example of a wireless communication device, in accordance with some examples.

FIG. 2 illustrates an example of a computing system 270 of a wireless device 207. The wireless device 207 can include a client device such as a UE (e.g., UE 104, UE 152, UE 190) or other type of device (e.g., a station (STA) configured to communication using a Wi-Fi interface) that can be used by an end-user. Wireless device can also include network devices (e.g., base stations such as eNBs and/or gNBs, Wi-Fi access points (APs) such as routers, range extenders or the like, etc.). For example, the wireless device 207 can include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 270 includes software and hardware components that can be electrically or communicatively coupled via a bus 289 (or may otherwise be in communication, as appropriate). For example, the computing system 270 includes one or more processors 284. The one or more processors 284 can include one or more CPUs, ASICS, FPGAs, APs, GPUs, VPUs, NSPs, microcontrollers, dedicated hardware, any combination thereof, and/or other processing device or system. The bus 289 can be used by the one or more processors 284 to communicate between cores and/or with the one or more memory devices 286.

The computing system 270 may also include one or more memory devices 286, one or more digital signal processors (DSPs) 282, one or more subscriber identity modules (SIMs) 274, one or more modems 276, one or more wireless transceivers 278, one or more antennas 287, one or more input devices 272 (e.g., a camera, a mouse, a keyboard, a touch sensitive screen, a touch pad, a keypad, a microphone, and/or the like), and one or more output devices 280 (e.g., a display, a speaker, a printer, and/or the like).

In some aspects, computing system 270 can include one or more radio frequency (RF) interfaces configured to transmit and/or receive RF signals. In some examples, an RF interface can include components such as modem(s) 276, wireless transceiver(s) 278, and/or antennas 287. The one or more wireless transceivers 278 can transmit and receive wireless signals (e.g., signal 288) via antenna 287 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 270 can include multiple antennas or an antenna array that can facilitate simultaneous transmit and receive functionality. Antenna 287 can be an omnidirectional antenna such that radio frequency (RF) signals can be received from and transmitted in all directions. The wireless signal 288 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 288 may be transmitted directly to other wireless devices using sidelink communications (e.g., using a PC5 interface, using a DSRC interface, etc.). Wireless transceivers 278 can be configured to transmit RF signals for performing sidelink communications via antenna 287 in accordance with one or more transmit power parameters that can be associated with one or more regulation modes. Wireless transceivers 278 can also be configured to receive sidelink communication signals having different signal parameters from other wireless devices.

In some examples, the one or more wireless transceivers 278 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end can generally handle selection and conversion of the wireless signals 288 into a baseband or intermediate frequency and can convert the RF signals to the digital domain.

In some cases, the computing system 270 can include a coding-decoding device (or CODEC) configured to encode and/or decode data transmitted and/or received using the one or more wireless transceivers 278. In some cases, the computing system 270 can include an encryption-decryption device or component configured to encrypt and/or decrypt data (e.g., according to the AES and/or DES standard) transmitted and/or received by the one or more wireless transceivers 278.

The one or more SIMs 274 can each securely store an international mobile subscriber identity (IMSI) number and related key assigned to the user of the wireless device 207.

The IMSI and key can be used to identify and authenticate the subscriber when accessing a network provided by a network service provider or operator associated with the one or more SIMs 274. The one or more modems 276 can modulate one or more signals to encode information for transmission using the one or more wireless transceivers 278. The one or more modems 276 can also demodulate signals received by the one or more wireless transceivers 278 in order to decode the transmitted information. In some examples, the one or more modems 276 can include a Wi-Fi modem, a 4G (or LTE) modem, a 5G (or NR) modem, and/or other types of modems. The one or more modems 276 and the one or more wireless transceivers 278 can be used for communicating data for the one or more SIMs 274.

The computing system 270 can also include (and/or be in communication with) one or more non-transitory machine-readable storage media or storage devices (e.g., one or more memory devices 286), which can include, without limitation, local and/or network accessible storage, a disk drive, a drive array, an optical storage device, a solid-state storage device such as a RAM and/or a ROM, which can be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 286 and executed by the one or more processor(s) 284 and/or the one or more DSPs 282. The computing system 270 can also include software elements (e.g., located within the one or more memory devices 286), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 207 can include means for performing operations described herein. The means can include one or more of the components of the computing system 270. For example, the means for performing operations described herein may include one or more of input device(s) 272, SIM(s) 274, modems(s) 276, wireless transceiver(s) 278, output device(s) (280), DSP(s) 282, processors (284), memory device(s) 286, and/or antenna(s) 287.

In some aspects, wireless device 207 can include: means for receiving a first Physical Downlink Shared Channel communication; means for determining, from the first PDSCH communication, a first combined transport block including a plurality of components, the plurality of components including a first control component associated with a first user equipment; means for generating a first transport block that includes the first control component; and means for transmitting the first transport block. In some examples, the means for receiving can include the one or more wireless transceivers 278, the one or more modems 276, the one or more SIMs 274, the one or more processors 284, the one or more DSPs 282, the one or more memory devices 286, any combination thereof, or other component(s) of the wireless device. In some examples, the means for determining can include the one or more processors 284, the one or more DSPs 282, the one or more memory devices 286, any combination thereof, or other component(s) of the wireless device. In some examples, the means for generating can include the one or more processors 284, the one or more DSPs 282, the one or more memory devices 286, any combination thereof, or other component(s) of the wireless device. In some examples, the means for transmitting can include the one or more wireless transceivers 278, the one or more modems 276, the one or more SIMs 274, the one or more processors 284, the one or more DSPs 282, the one or more memory devices 286, any combination thereof, or other component(s) of the wireless device.

In some examples, wireless device 207 can include: means for generating a combined transport block including a plurality of components and routing information indicating at least one route associated with a first user equipment; and means for transmitting the combined transport block in a Physical Downlink Shared Channel (PDSCH) communication. In some examples, the means for generating can include the one or more processors 284, the one or more DSPs 282, the one or more memory devices 286, any combination thereof, or other component(s) of the wireless device. In some examples, the means for transmitting can include the one or more wireless transceivers 278, the one or more modems 276, the one or more SIMs 274, the one or more processors 284, the one or more DSPs 282, the one or more memory devices 286, any combination thereof, or other component(s) of the wireless device.

Figure 3:
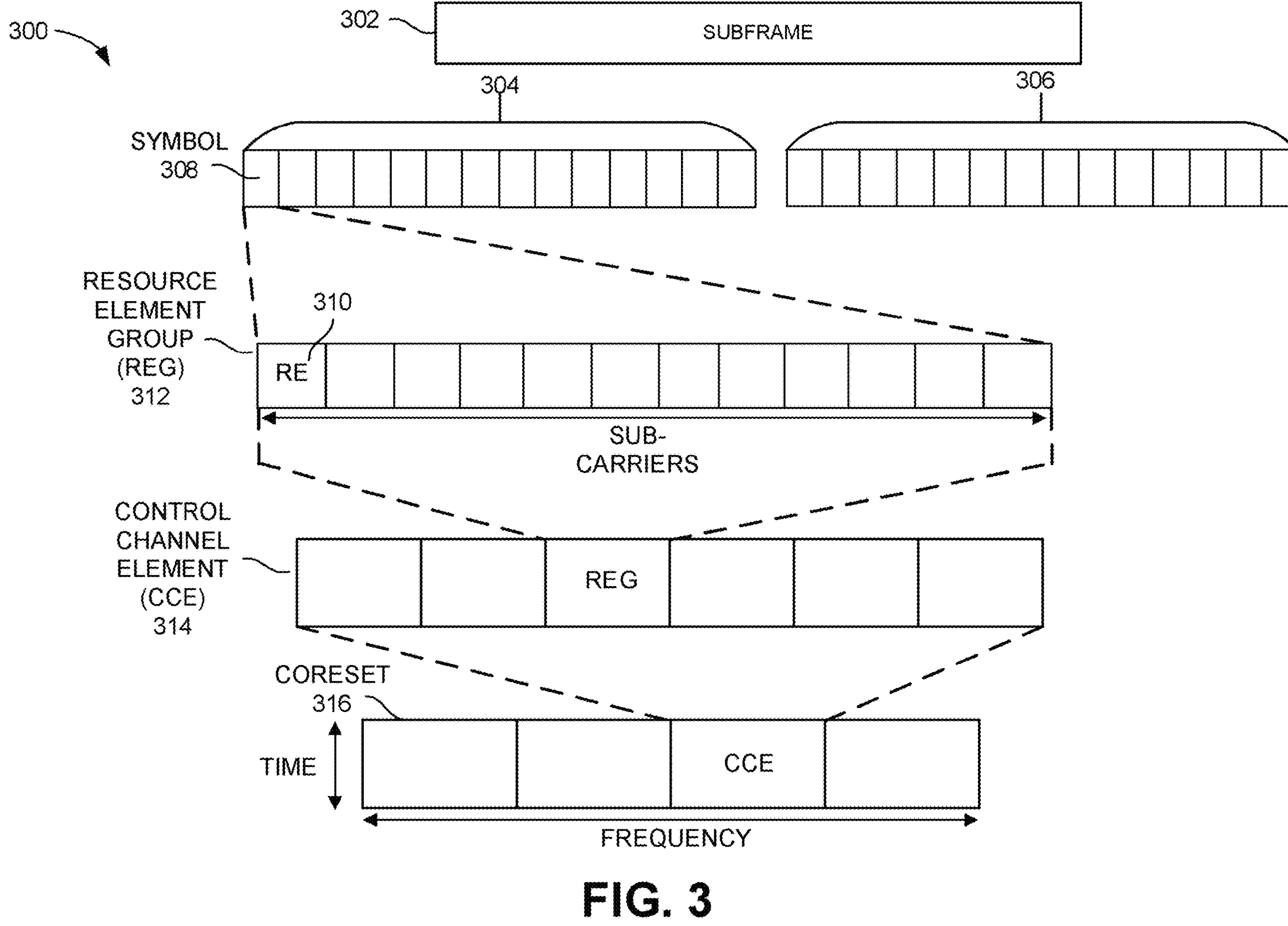
FIG. 3 is a diagram illustrating an example of resource structure, in accordance with some examples.

FIG. 3 illustrates an example resource structure 300 that includes various groups of 5G/New Radio (NR) resources. For example, resource structure 300 can include a subframe 302 which can have a duration of 1 millisecond (ms) and can correspond to one of ten subframes included in a frame (not illustrated). In some examples, subframe 302 can include one or more slots such as slot 304 and slot 306. Although resource structure 300 is illustrated as having two slots per subframe, a different number of slots can be included in a subframe (e.g., 4 slots, 8 slots, 16 slots, 32 slots, or any other number of slots).

In some examples, each of slot 304 and slot 306 can include one or more orthogonal frequency-division multiplexing (OFDM) symbols such as symbol 308. As illustrated, slot 304 and slot 306 each include 14 symbols (e.g., symbol 308). In some cases, a slot may have a different number of symbols. In some aspects, each symbol can be transmitted using one or more frequency subcarriers. A symbol (e.g., symbol 308) that is transmitted on a single subcarrier can be referred to as a resource element (RE), such as RE 310. In some cases, a resource element (e.g., RE 310) can correspond to the smallest resource unit in a 5G/NR network, corresponding to one subcarrier in one OFDM symbol. In some examples, RE 310 can be identified according to its position using coordinates (k, l), in which 'k' corresponds to the index in the frequency domain (e.g., identifies the RE sub-carrier) and 'l' corresponds to the symbol position in the time domain relative to a reference point.

In some aspects, a group of 12 REs can be referred to as a resource block (RB). In further aspects, a resource block that includes control information can correspond to a resource element group (REG) 312. In some cases, REG 312 can include a portion of REs that correspond to control information (e.g., 9 REs can correspond to Physical Downlink Control Channel (PDCCH) payload) and another portion of REs (e.g., 3 REs) that correspond to a demodulation reference signal (DMRS).

In some examples, resource structure 300 can include control channel element (CCE) 314, which can include six resource element groups (e.g., REG 312). In some cases, CCE 314 may include a different number of REGs. CCE 314 can include control information (e.g., Downlink Control Information (DCI)) that can be used to provide control information to one or more UEs as part of a control resource set (CORESET) 316. In some examples, CORESET 316 can correspond to a set of physical resources within one or more predefined areas in the downlink resource grid.

In some aspects, a CORESET can include one or more CCEs, which can be configured based on an aggregation level (AL) used by the base station. As illustrated, CORESET 316 includes four CCEs (e.g., CCE 314), which can correspond to an AL of four. In other AL implementations, a CORESET may include 1 CCE, 2 CCEs, 4 CCEs, 8 CCEs, 16 CCEs, or any other number of CCEs. In some aspects, a CORESET may occupy the first symbol of a slot (e.g., slot 304). In other aspects, a CORESET may occupy the first two symbols of slot or the first three symbols of a slot. As illustrated, CORESET 316 occupies 1 symbol in the time domain and 288 subcarriers (e.g., 12 subcarriers per REG, 6 REGs per CCE, and 4 CCEs in CORESET 316) in the frequency domain.

In some examples, a CORESET can be associated with a CCE to REG mapping which can be interleaved or non-interleaved. In the non-interleaved case, all CCEs can be mapped to consecutive REGs for the associated CORESET. In some examples, a non-interleaved configuration can be used to facilitate localized beamforming. In an interleaved configuration, REGs can be distributed on the frequency domain over the entire CORESET bandwidth. In some cases, an interleaved configuration can provide frequency diversity in order to reduce the effects of distortion or interference on a particular frequency.

In some aspects, a UE can obtain control information by monitoring and decoding one or more CORESETs that are transmitted in a search space. In some examples, a search space can correspond to a common search space (e.g., monitored by all UEs), a UE-specific search space that is monitored by a particular UE, or a group-common search space that is monitored by a particular group of UEs.

In some cases, the search space(s) allocated for CORESETs (e.g., CORESET 316) in a downlink resource grid may be insufficient to provide control information to all UEs associated with a base station. For example, a base station may be associated with one or more UEs that are not in direct communication with the base station. For example, UEs that are located outside or on the fringe of the coverage area of a base station may be associated with the base station by using sidelink transmissions to communicate with one or more relay devices that are also associated with the base station. In some aspects, control information can be provided to one or more UEs using a Physical Downlink Shared Channel (PDSCH) communication, which can be associated with a greater amount of resources (e.g., resource blocks) in the downlink resource grid.

Figure 4:
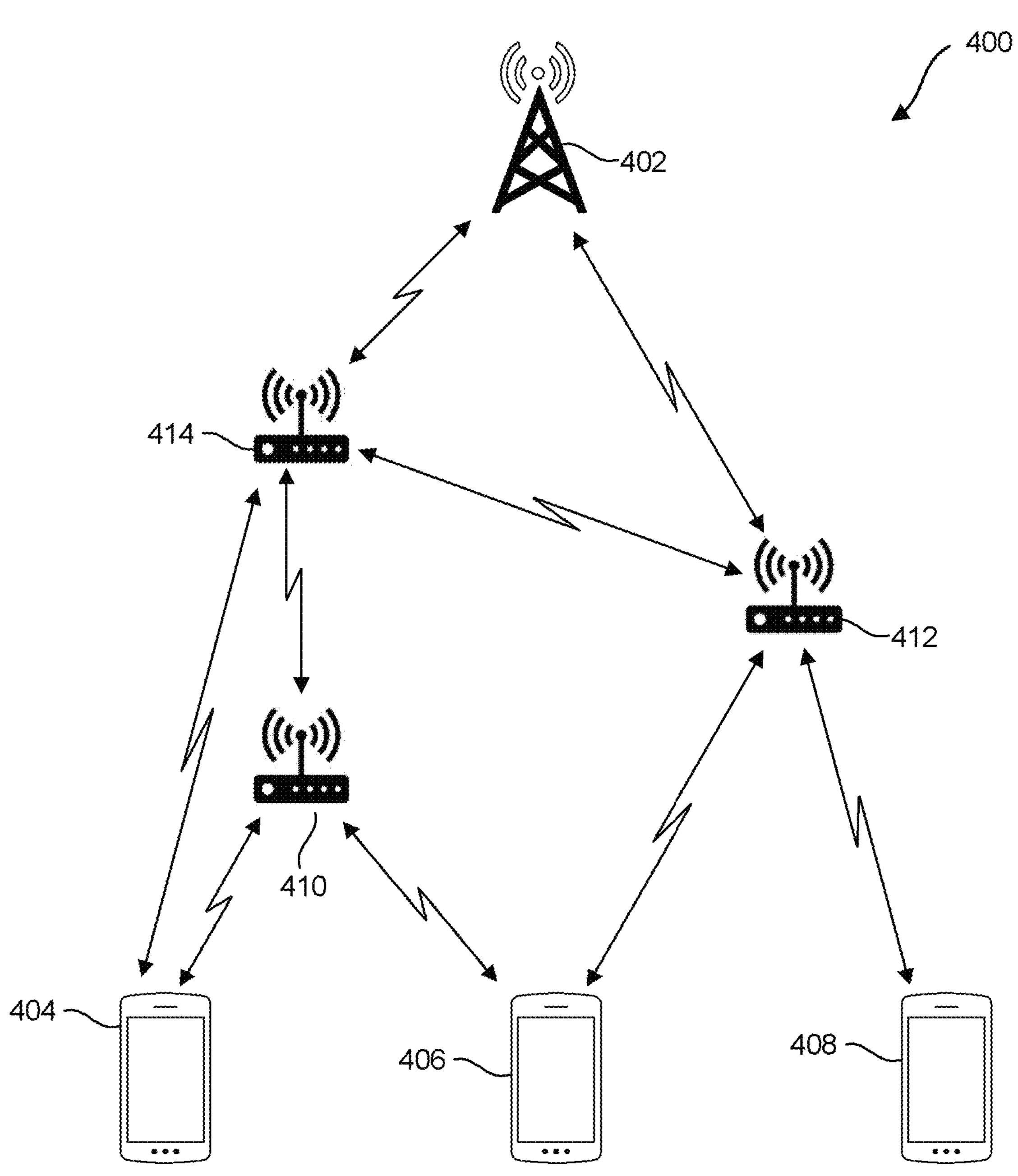
FIG. 4 is a block diagram illustrating another example of a wireless communication network, in accordance with some examples.

FIG. 4 illustrates an example of a wireless communication system 400 including devices configured to perform sidelink transmissions based on Physical Downlink Shared Channel (PDSCH) communications. While the system 400 is described using user equipment (UE) and base stations (BSs) as illustrative examples, the techniques described with respect to the system 400 can be performed by Wi-Fi stations (STA) and access points (APs) or by other devices that communicate using other communication protocols.

As illustrated in FIG. 4, the system 400 includes a base station 402. In some aspects, base station 402 can include macro cell base stations and/or small cell base stations, as described in connection with system 100 (e.g., base stations 102). In other aspects, base station 402 can include a wireless access point, such as, for example, AP 150 described in connection with system 100.

In some examples, system 400 can include one or more user equipments (UEs), such as UE 404, UE 406, and UE 408. As noted with respect to FIG. 1, a UE may include and/or be referred to as an access terminal, a user device, a user terminal, a client device, a wireless device, a subscriber device, a subscriber terminal, a subscriber station, a mobile device, a mobile terminal, a mobile station, or variations thereof. In some cases, system 400 can further include one or more relay devices, such as relay 410, relay 412, and relay 414. As used herein, a relay device may include any wireless device that can be configured to perform wireless communications. For example, a relay device can include a UE, a small cell base station, or any other type of wireless device.

In some aspects, UE 404, UE 406, and UE 408 can communicate with base station 402 in uplink (UL) and/or downlink (DL) directions using one or more routes provided by relays 410, 412, and 414. DL refers to the transmission direction from base station 402 to a UE, and UL refers to the transmission direction from a UE to base station 402. In some cases, any one of UE 404, UE 406, and/or UE 408 may be located outside or on the fringe of a coverage area corresponding to base station 402 while relay 410, relay 412, and/or relay 414 may be located within a coverage area corresponding to base station 402. In some examples, the UEs (e.g., UE 404, UE 406, and UE 408) and the relays (e.g., relay 410, relay 412, and relay 414) may utilize sidelink communications to transmit and/or receive data to each other.

As illustrated, UE 404 and base station 402 can utilize up to three different routes to send/receive data. With respect to the UL direction, the nodes in the first route can include relay 414; the nodes in the second route can include relay 410 and relay 414; and the nodes in the third route can include relay 414 and relay 412.

As illustrated, UE 406 and base station 402 can utilize up to three different routes to send/receive data. With respect to the UL direction, the nodes in the first route can include a single relay 412; the nodes in the second route can include relay 412 and relay 414; and the nodes in the third route can include relay 410 and relay 414.

As illustrated, UE 408 and base station 402 can utilize up to two different routes to send/receive data. With respect to the UL direction, the nodes in the first route can include a single relay 412; and the nodes in the second route can include relay 412 and relay 414. In some aspects, routes between UEs (e.g., UE 404, UE 406, and UE 408) and base station 402 can change based on factors such as movement of UEs, movement of relays, configuration of new relays, signal conditions, re-allocation of network resources, etc.

In some aspects, base station 402 can determine and provide control information corresponding to each of the UEs (UE 404, UE 406, and UE 408) and/or to each of the relays (relay 410, relay 412, and relay 414). In some examples, control information can include UL scheduling grants (e.g., Physical Uplink Shared Channel (PUSCH) resource scheduling information), DL scheduling assignments (e.g., Physical Downlink Shared Channel (PDSCH) resource scheduling information), uplink power control indication, slot format indication, preemption indication (e.g., identify resources not used for transmission to notified device), etc. In some cases, control information can be encoded as part of a combined transport block that can be transmitted by base station 402 using a Physical Downlink Shared Channel (PDSCH) communication.

In some examples, base station 402 can generate one or more combined transport blocks that can include control components and/or data components corresponding to one or more of the UEs (UE 404, UE 406, and UE 408) and/or the relays (relay 410, relay 412, and relay 414). For example, base station 402 can generate a combined transport block that includes control components and data components corresponding to UE 404, UE 406, UE 408, relay 410, relay 412, and relay 414, or a subset thereof. In some aspects, the control components and the data components can each be encoded separately to facilitate decoding of individual components by a respective UE and/or relay. In some examples, a combined transport block that includes control components and data components can be sent as a single Physical Downlink Shared Channel (PDSCH) communication.

In another example, base station 402 can generate one or more combined transport blocks that can include control components (e.g., PDCCH components) and base station 402 can also generate one or more combined transport blocks that can include data components. In some implementations, each of the combined transport blocks (e.g., including control components or data components) can be sent in separate PDSCH communications.

In some aspects, base station 402 can generate a combined transport block that includes one or more headers. A header or preamble may refer to information appended to a message by a physical layer (e.g., PHY layer) before transmission, such as by base station 402. A header may also refer to information appended to a message by a medium access control (MAC) layer before the message is passed to the PHY layer for transmission, information appended by a radio link control (RLC) layer before the message is passed to the MAC layer, information appended by a packet data convergence protocol (PDCP) layer before the message is passed to the RLC layer, and/or information appended by other layers.

In some examples, the one or more headers in a combined transport block can include information to identify resources or range(s) of resources associated with one or more component transport blocks (e.g., resource elements, resource blocks, frames, subframes, or any other suitable manner to identify a resource). In some cases, the one or more headers in a combined transport block can also include a destination identifier associated with a UE or relay device, routing information (e.g. one or more nodes identified in routes to one or more UEs), downlink resource allocation for transmission of the combined transport block, uplink resource allocation, etc. In some aspects, information associated with a header can be included in two or more headers. In some cases, one or more of the headers may be encoded together with one or more of the component transport blocks (e.g., the control blocks or data blocks).

Figure 5A:
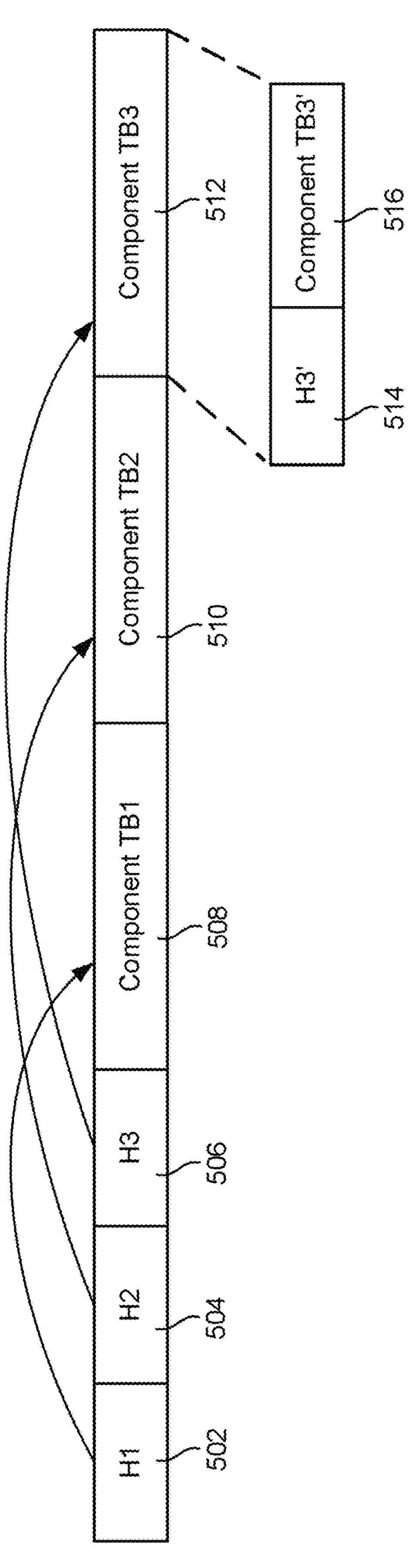
FIG. 5A is a diagram illustrating an example of a combined transport block, in accordance with some examples.

FIG. 5A illustrates an example of a combined transport block 500. Combined transport block 500 includes header H1 502 that corresponds to component TB1 508; header H2 504 that corresponds to component TB2 510; and header H3 506 that corresponds to component TB3 512.

In one example, component TB1 508 can include control components and data components associated with UE 404 (e.g., control components and data components for a UE can be encoded in a single component TB). In another example, component TB1 can include control components associated with UE 404 and the corresponding data components can be sent in a separate component TB as part of a different combined transport block (e.g., separate PDSCH communication). In some cases, header H1 502 can include a destination identifier associated with UE 404. In some examples, header H1 502 can include an identification of the resource range for component TB1 508 (e.g., identify time and frequency of resources associated with component TB1 508 such as resource elements and/or resource blocks). In some examples, header H1 502 can include routing information that identifies one or more nodes in a route to UE 404. For instance, routing information may identify relay 414 as a first route to UE 404 and routing information may also identify relay 414 and relay 410 as a second route to UE 404. In some cases, header H1 502 can also include a downlink resource allocation for transmission of a combined transport block or of a component transport block (e.g., for relay 414 to transmit a combined transport block to relay 410). In some examples, header H1 502 can include resource allocation for an uplink transmission (e.g., PUSCH allocation for relay 414). In some aspects, resource allocation for an uplink transmission can be included in the control components (e.g., Downlink Control Information (DCI) corresponding to UE 404).

In some aspects, information associated with a header can be separated among two or more headers. For example, header H3 506 can include the destination identifier associated with component TB3 512 as well as the information identifying the resources corresponding to component TB3 512. Based on the destination identifier in header H3 506, a relay can determine whether the corresponding component TB (e.g., component TB3 512) needs to be decoded. For example, if component TB3 512 is associated with UE 408, relay 410 can determine that it does not need to decode component TB3 512 because relay 410 is not in communication with UE 408. In another example, relay 412 can determine that component TB3 512 should be decoded because relay 412 is in communication with UE 408.

In some cases, a second header such as header H3' 514 can be encoded within component TB3 512. If a relay device proceeds to decode component TB3 512, the relay device can extract header H3' 514 which can include information identifying the resources corresponding to component TB3' 516, downlink resource allocation for transmission of combined resource block, routing information, resource allocation for uplink transmissions, etc.

Figure 5B:
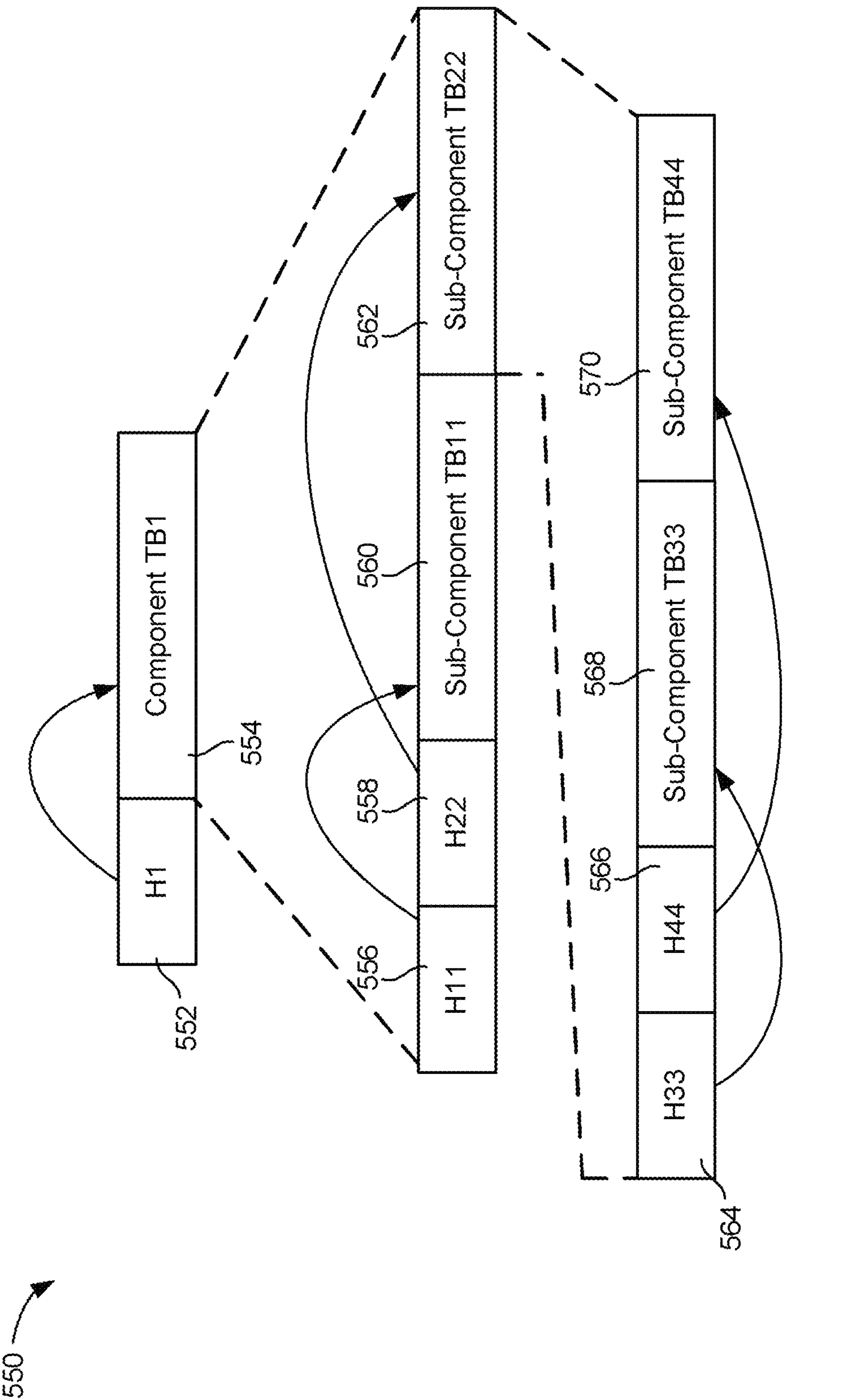
FIG. 5B is a diagram illustrating another example of a combined transport block, in accordance with some examples.

FIG. 5B illustrates another example of a combined transport block 550. In some aspects, combined transport block 550 can be implemented using a layered structure in which control blocks and/or data blocks for child nodes are aggregated as sub-component TBs that are encoded in a component TB. For example, base station 402 can generate combined TB 550 that can include header H1 552, which can include a node identifier corresponding to relay 414. In some aspects, header H1 552 can also include information identifying resources or range of resource associated with component TB1 554 and a downlink resource allocation to forward a component TB and/or a combined TB.

In some examples, relay 414 can decode component TB1 554 and identify header H11 556, which can include information identifying resources or range of resources associated with sub-component TB11 560. In some aspects, sub-component TB11 560 can include control components or data components corresponding to relay 414. In some aspects, relay 414 can identify header H22 558 that is associated with sub-component TB22 562. In some examples, header H22 558 may include a node identifier corresponding to relay 410. Header H22 558 may also include information identifying resources or range of resource associated with sub-component TB22 562 and a downlink resource allocation to forward sub-component TB22 562. Based on the information in header H22 558, relay 414 can determine that sub-component TB22 562 is associated with relay 410. In some aspects, relay 414 can generate a new combined transport block that includes header H22 558 and sub-component TB22 and forward the new combined transport block to relay 410 (e.g., via a sidelink transmission using a PDSCH communication corresponding to the downlink resource allocation in header H22 558). In some examples, the layered structure used by combined transport block 550 can be implemented without including routing information.

In some aspects, relay 410 can receive the new combined TB that includes header H22 558 and sub-component TB22 562. Based on the information in header H22 558 (e.g., node identifier corresponding to relay 410), relay 410 can decode sub-component TB22 and identify header H33 564 and header H44 566. In some examples, information in header H33 564 may include a node identifier corresponding to UE 404 and information in header H44 566 may include a node identifier corresponding to UE 406. Based on the information in the corresponding headers, relay 410 can determine that sub-component TB33 568 corresponds to UE 404 and sub-component TB44 570 corresponds to UE 406. In some examples, relay 410 can forward control components and/or data components to UE 404 and UE 406 using the downlink resource allocation identified in the respective headers. In some aspects, control components can be forwarded to a UE (e.g., UE 404 or UE 406) using a Physical Downlink Control Channel (PDCCH) communication and data components can be forwarded to a UE using a Physical Downlink Shared Channel (PDSCH) communication.

Returning to FIG. 4, as noted above, base station 402 can aggregate control components and/or data components for all nodes (e.g., relay 412, relay 414, relay 410, UE 404, UE 406, and UE 408) and generate combined transport block(s) (e.g., using configuration described in FIG. 5A or FIG. 5B) that can be sent using a Physical Downlink Shared Channel (PDSCH) communication. In some aspects, base station 402 can send a combined transport block as a broadcast PDSCH communication that can be received by one or more nodes. In some cases, base station 402 can send a combined transport block as a PDSCH communication that is directed to a particular node. In some aspects in which the PDSCH communication is directed to a particular node, base station 402 can generate a combined transport block that includes control components and/or data components that are associated with a subset of nodes (e.g., nodes that are in a particular route).

In some aspects, a node (e.g., relay 414 and/or relay 412) can receive a PDSCH communication from base station 402 that includes a combined transport block. In some examples, the combined transport block can include control components and data components. In other examples, one or more combined transport block can be received (e.g., via first PDSCH communication) that include control components and/or one or more combined transport blocks can be received (e.g., via a second PDSCH communication) that include data components.

In some cases, relay 414 and/or relay 412 can attempt to decode the information in the combined transport block(s). In some aspects, if relay 414 and/or relay 412 fail to decode one or more data components, the relay may send a feedback message to base station 402 requesting retransmission of the failed data components. In some examples, if relay 414 and/or relay 412 fail to decode one or more control components, the relay may send a feedback message to base station 402 indicating that a failure occurred with respect to control information. In some examples, base station 402 may retransmit the control components to the relay, which can then be used by the relay to identify associated data components. In another example, base station 402 may determine new control information and send control components as well as associated data components to the relay device.

In some aspects, relay 414 and/or relay 412 can process combined transport block(s) received via PDSCH communications to identify the component transport blocks and the nodes associated with the component transport blocks. For example, relay 414 can determine, based on a destination identifier or a node identifier located in a header (e.g., header H1 502) that a component TB (e.g., component TB1 508) is directed to relay 414. In some aspects, relay 414 can remove its own content (e.g., component transport block) and forward remaining content to one or more other nodes. In some aspects, relay 414 can remove content that is associated with one or more nodes that are not in a particular route or path. For example, relay 414 can remove content associated with UE 408 and generate a new combined transport block that includes component transport blocks associated with relay 410, UE 404, and UE 406.

In some examples, relay 414 can forward the new combined transport block directly to relay 410 using a sidelink transmission that includes a PDSCH communication. In some cases, relay 414 can identify relay 410 as the next node in a route based on routing information that is included in the combined transport block (e.g., in header H1 502). In some aspects, the sidelink transmission can correspond to downlink resources identified by base station 402 in a header of the combined transport block. In another example, relay 414 can forward the new combined transport block to multiple relays (e.g., relay 412 and relay 410) simultaneously by using a broadcast PDSCH communication. In some examples, each node (e.g., relay 412 and relay 410) may be configured to use (e.g., by base station 402) a common Radio Network Temporary Identifier (RNTI). In some aspects, a common RNTI can be used to identify a particular group of nodes in a broadcast PDSCH communication (e.g., from a relay to a group of other relays or from a base station to a group of relays). In some aspects, the new combined transport block generated by relay 414 can have a structure similar to combined transport block 500 or combined transport block 550.

In some aspects, relay 414 can process the combined transport block received from base station 402 to identify and/or extract a component TB that is associated with UE 404. In some cases, relay 414 can determine that the component TB directed to UE 404 includes one or more control components. In some examples, relay 414 can generate a Physical Downlink Control Channel (PDCCH) communication that includes the one or more control components associated with UE 404. In some cases, relay 414 can send the PDCCH communication to UE 404 using a sidelink transmission that corresponds to downlink resources identified by base station 402. In some examples, relay 414 can determine that the component TB directed to UE 404 includes one or more data components. In some cases, relay 414 can generate a PDSCH communication that includes the one or more data components associated with UE 404. In some aspects, relay 414 can sent the PDSCH communication to UE 404 using a sidelink transmission that corresponds to downlink resources identified by base station 402 (e.g., in a header of the combined transport block).

In some aspects, relay 414 can remove content (e.g., component TB) associated with UE 404 from the combined transport block that is sent to relay 410. For example, relay 414 can determine that component TB associated with UE 404 can be removed because relay 414 has forwarded the component TB to UE 404. In another example, relay 414 can include content associated with UE 404 in the combined transport block that is sent to relay 410. In some aspects, relay 410 can send a second copy of the component TB to UE 404 (e.g., via PDCCH communication for control components and via PDSCH for data components). In some cases, transmission of a same component TB to a particular UE by two or more relays (e.g., relay 414 and relay 410 to UE 404) can provide redundancy and improve reliability of data/control transmission to a UE.

In some examples, relay 412 can also process a combined transport block received from base station 402 that includes control components and/or data components for all nodes (e.g., relay 412, relay 414, relay 410, UE 404, UE 406, and UE 408) or a subset thereof. In some aspects, relay 412 can determine that it is not in a path our route associated with relay 414, relay 410, and UE 404, and relay 412 can remove content (e.g., transport blocks) associated with each of the unassociated nodes identified. In some cases, relay 412 can also remove content that it identifies as being associated with itself.

In some aspects, relay 412 can determine that the combined transport block from base station 402 includes control components and/or data components associated with UE 406 and/or UE 408. In some cases, relay 412 can generate one or more new transport blocks that include the control components and/or data components. In some examples, the one or more new transport blocks can be sent to UE 406 and/or UE 408 using a sidelink transmission. In some cases, relay 412 can generate a PDCCH communication that can be used to send control components to UE 406 and/or UE 408. In another example, relay 412 can generate a PDSCH communication that can be used to send data components to UE 406 and/or UE 408.

Figure 6:
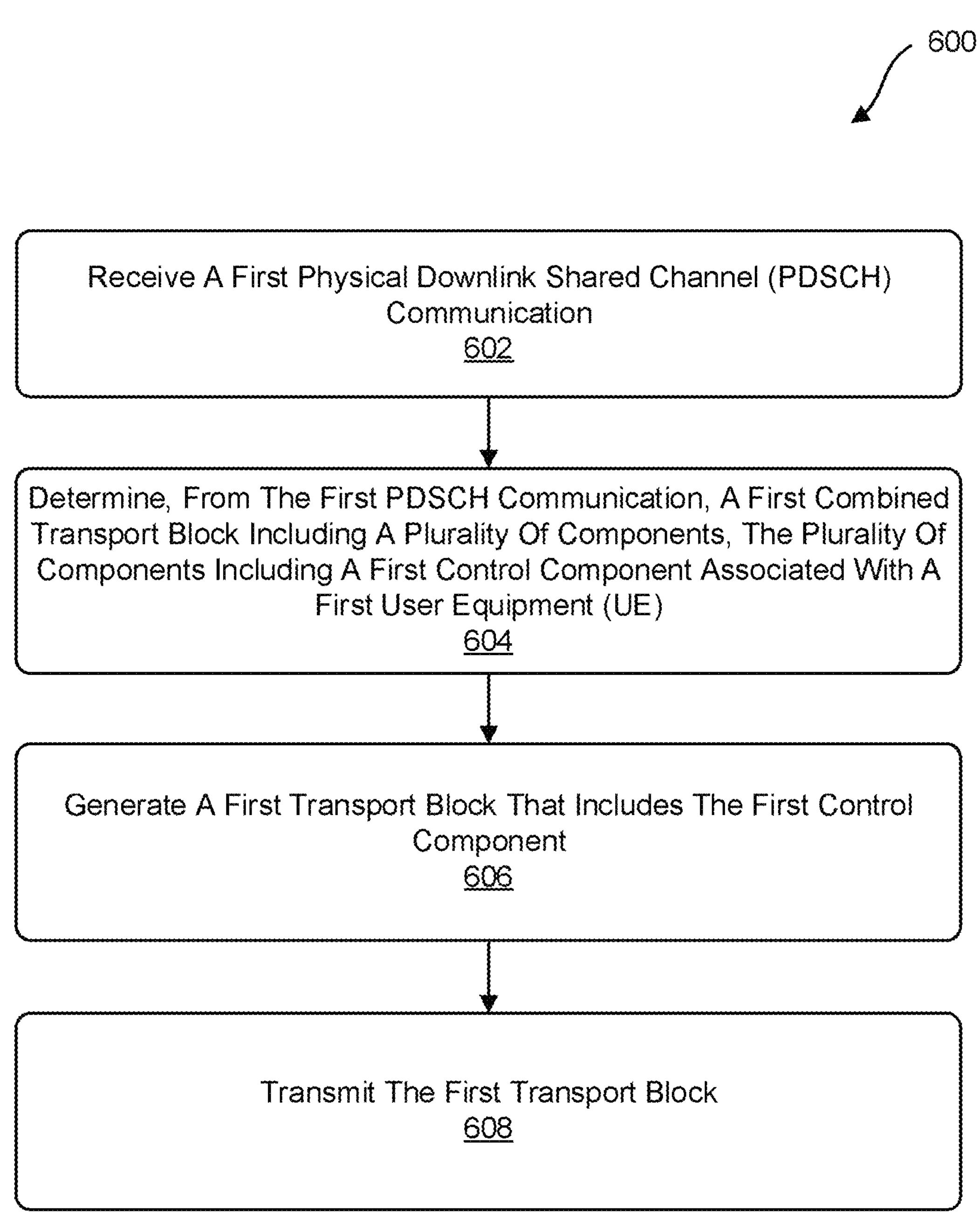
FIG. 6 is a flow diagram illustrating an example of a process for performing wireless communications, in accordance with some examples.

FIG. 6 is a flow diagram illustrating an example of a process 600 of performing wireless communications using the techniques described herein. At block 602, the process 600 includes receiving a first Physical Downlink Shared Channel (PDSCH) communication. The PDSCH communication can be received by a node such as a relay device (e.g., relay 414, relay 412, relay 410). In some aspects, the PDSCH communication is received from a base station (e.g., base station 402) or from anther relay device.

At block 604, the process includes determining, from the first PDSHC communication, a first combined transport block including a plurality of components, the plurality of components including a first control component associated with a first user equipment (UE). In some aspects, the first combined transport block can have a structure similar to that of combined transport block 500 or combined transport block 550.

In some cases, the plurality of components in the combined transport block can correspond to component transport blocks (e.g., component TB1 508, component TB2 510). In some examples, the plurality of components can include a plurality of Downlink Control Information (DCI) components. In some aspects, the first control component can include any type of control information (e.g., UL scheduling grants, DL scheduling assignments, uplink power control indication, slot format indication, preemption indication, any other control information, and/or any combination thereof).

At block 606, the process includes generating a first transport block that includes the first control component. At block 608, the process includes transmitting the first transport block. In some aspects, generating the first transport block can include generating a Physical Downlink Control Channel (PDCCH) communication that is transmitted to the first UE. For example, a relay (e.g., relay 414) may determine that it is in direct communication with the first UE (e.g., UE 404 can correspond to the first UE and is the next node in a route from relay 410). Relay 414 can send a PDCCH communication to UE 404 that includes the first control component, which was extracted from the first combined transport block determined from the first PDSCH communication.

In some examples, the process can include generating a second combined transport block that includes the first control component and transmitting a second PDSCH communication that includes the second combined transport block to at least one node that is part of a route to the first UE, wherein the at least one node is configured to transmit the first control component to the first UE. For example, relay 414 can determine that relay 410 is part of a route to UE 404. In some aspects, relay 414 can generate a combined transport block that includes the first control component and send it to relay 410 using a PDSCH communication. In some examples, relay 410 can be configured to transmit the first control component to UE 404. In some implementation, UE 404 can receive the first control components from multiple routes (e.g., from relay 414 and from relay 410).

In some aspects, transmitting the first transport block can include broadcasting the first transport block to a plurality of nodes. For example, relay 414 can send a broadcast PDSCH communication that can be received by relay 412 and relay 410. In some examples, the process can include determining, based on routing information associated with the first control component, at least one node that is part of a route to the first UE. Referring to FIG. 4, relay 414 can use routing information associated with the first control component to determine that relay 410 corresponds to a node that is part of a route to UE 404.

In some examples, the first transport block can correspond to a second PDSCH communication that is transmitted to the at least one node (e.g., identified according to routing information). In some aspects, the second PDSCH communication can correspond to combined transport block that is generated by a relay. For example, relay 414 can process a combined transport block received via the first PDSCH communication (e.g., from base station 402) to extract content that is associated with itself. Relay 414 can generate a new combined transport block that includes content (e.g., transport blocks) associated with one or more other nodes and can transmit the new combined transport block using a second PDSCH communication (e.g., either directly to other node(s) or using a broadcast PDSCH communication).

In some aspects, the plurality of components in the combined transport block can include a first data component that is associated with the first UE and is encoded separately from the first control component. For example, the first control component and the first data component can be encoded separately within component TB1 508 or may correspond to separate TBs within the combined transport block (e.g., TB1 508 and TB2 510). In some cases, the process can include generating a second transport block that includes the first data component and generating a second combined transport block that includes the first transport block (e.g., first control component) and the second transport block (e.g., first data component). For example, relay 414 can generate a combined transport block that includes component transport blocks corresponding to one or more data components and/or one or more control components. The combined transport block can be transmitted using a PDSCH communication.

In some examples, the process can include determining whether the first data component can be decoded, and, in response to a determination that the first data component cannot be decoded, transmitting a feedback message to a base station requesting retransmission of the first data component. For example, relay 412 may receive a combined transport block from base station 402 and attempt to decode the combined transport block. If the decode process fails with respect to a data component, relay 412 can send a message requesting retransmission of the data component. In some aspects, if decode fails with respect to a control component, relay 412 can send a message with an indication of the failure. In some examples, base station 402 may retransmit the control component. In other examples, base station 402 may transmit new control components together with any associated data components.

In some aspects, the first combined transport block can include at least one header that contains information such as a destination identifier corresponding to a component transport block, routing information (e.g., to a destination node), resource/range identification (e.g., time/frequency of resources associated with component transport block), and/or transmission resource allocation (e.g., downlink transmission resource and/or uplink transmission resource). In some examples, the at least one header can correspond to a first header and a second header, wherein the second header is encoded with the first control component. Referring to FIG. 5A, the first header can correspond to H3 506 and the second header can correspond to H3' 514. In some examples, the at least one header can correspond to at least one component from the plurality of components and the at least one component can include a plurality of sub-components corresponding to a plurality of UEs. Referring to FIG. 5B, the at least one header can correspond to header H1 552 and the at least one component can correspond to component TB1 554. As further illustrated, component TB1 554 includes sub-component TB11 560 and sub-component TB22 562, which can correspond to a plurality of UEs.

Figure 7:
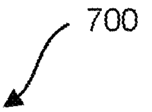
FIG. 7 is a flow diagram illustrating another example of a process for performing wireless communications, in accordance with some examples.

FIG. 7 is a flow chart diagram illustrating another example of a process 700 of performing wireless communications. At block 702, the process 700 includes generating a combined transport block including a plurality of components and routing information indicating at least one route associated with a first user equipment (UE). In one example, base station 402 can generate a combined transport block that includes a plurality of components and at least one route associated with a first UE. For instance, the at least one route can correspond to relay 414 and relay 410 as a route to UE 406. In some aspects, the plurality of components can include at least one Downlink Control Information (DCI) component.

At block 704, the process 700 includes transmitting the combined transport block in a Physical Downlink Shared Channel (PDSCH) communication. In some aspects, the process can include determining at least one node that is part of the at least one route associated with the first UE, wherein the combined transport block is transmitted to the at least one node. As noted above, base station 402 can determine that the at least one route to UE 406 includes relay 414 and relay 410. In one example, base station 402 can determine that the at least one node corresponds to relay 414 and base station 402 can transmit the combined transport block to relay 414.

In some aspects, the process can include receiving, from the at least one node, a feedback message with an indication of a failure to decode at least one data component from the plurality of components, and transmitting, to the at least one node, a copy of the at least one data component. In one case, base station 402 may receive a feedback message from relay 414 indicating the relay 414 failed to decode at least one data component in the combined transport block. In response, base station 402 may transmit a copy of the at least one data component to relay 414.

In some examples, the process can include determining a control component and a data component associated with the first UE, wherein the control component and the data component are included in the plurality of components in the combined transport block. For example, base station 402 can determine a control component and a data component associated with UE 406 and base station 402 can include the control component and the data component in the combined transport block. In some examples, the combined transport block can have a structure that is similar to combined transport block 500 or combined transport block 550.

In some aspects, the combined transport block can include at least one header that contains information such as a destination identifier (e.g., corresponding to a component transport block), routing information (e.g., to a destination node), resource/range identification (e.g., time/frequency of resources associated with component transport block), and/or transmission resource allocation (e.g., downlink transmission resource and/or uplink transmission resource). In some examples, the at least one header can correspond to a first header and a second header, wherein the second header is encoded with at least one component from the plurality of components. Referring to FIG. 5A, the first header can correspond to header H3 506 and the second header can correspond to H3' 514, which can be encoded with component TB3 512.

In some examples, the processes described herein (e.g., process 600, process 700, and/or other process described herein) may be performed by a computing device or apparatus (e.g., a UE or a base station). In one example, the process 600 and/or process 700 can be performed by the wireless device 207 of FIG. 2.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 600 and 700 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 600, process 700, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1: A wireless communication relay device, comprising: at least one memory; at least one transceiver; and at least one processor coupled to the at least one memory and the at least one transceiver, the at least one processor configured to: receive, via the at least one transceiver, a first Physical Downlink Shared Channel (PDSCH) communication; determine, from the first PDSCH communication, a first combined transport block including a plurality of components, the plurality of components including a first control component associated with a first user equipment (UE); generate a first transport block that includes the first control component; and transmit, via the at least one transceiver, the first transport block.

Aspect 2: The wireless communication relay device of aspect 1, wherein the first transport block comprises a Physical Downlink Control Channel (PDCCH) communication that is transmitted to the first UE.

Aspect 3: The wireless communication relay device of any of aspects 1 to 2, wherein the at least one processor is configured to: generate a second combined transport block that includes the first control component; and transmit, via the at least one transceiver, a second PDSCH communication that includes the second combined transport block to at least one node that is part of a route to the first UE, wherein the second combined transport block comprises control information for transmitting the first control component to the first UE.

Aspect 4: The wireless communication relay device of any of aspects 1 to 3, wherein to transmit the first transport block the at least one processor is configured to broadcast, via the at least one transceiver, the first transport block to a plurality of nodes.

Aspect 5: The wireless communication relay device of any of aspects 1 to 4, wherein the at least one processor is configured to: determine, based on routing information associated with the first control component, at least one node that is part of a route to the first UE.

Aspect 6: The wireless communication relay device of aspect 5, wherein the first transport block comprises a second PDSCH communication that is transmitted to the at least one node.

Aspect 7: The wireless communication relay device of any of aspects 1 to 6, wherein at least one of the plurality of components comprises a Downlink Control Information (DCI) component.

Aspect 8: The wireless communication relay device of any of aspects 1 to 7, wherein the plurality of components includes a first data component that is associated with the first UE and is encoded separately from the first control component.

Aspect 9: The wireless communication relay device of aspect 8, wherein the at least one processor is configured to: generate a second transport block that includes the first data component; generate a second combined transport block that includes the first transport block and the second transport block; and transmit, via the at least one transceiver, the second combined transport block.

Aspect 10: The wireless communication relay device of any of aspect 8, wherein the at least one processor is configured to: determine whether the first data component can be decoded; and in response to a determination that the first data component cannot be decoded, transmit, via the at least one transceiver, a feedback message to a base station requesting retransmission of the first data component.

Aspect 11: The wireless communication relay device of any of aspects 1 to 10, wherein the first combined transport block includes at least one header, the at least one header including at least one of a destination identifier, a routing information, a range identification, and a transmission resource allocation.

Aspect 12: The wireless communication relay device of aspect 11, wherein the at least one header comprises a first header and a second header, wherein the second header is encoded with the first control component.

Aspect 13: The wireless communication relay device of aspect 11, wherein the at least one header corresponds to at least one component from the plurality of components, the at least one component including a plurality of sub-components corresponding to a plurality of UEs.

Aspect 14: A wireless communication base station, comprising: at least one memory; at least one transceiver; and at least one processor coupled to the at least one memory and the at least one transceiver, the at least one processor configured to: generate a combined transport block including a plurality of components and routing information indicating at least one route associated with a first user equipment (UE); and transmit, via the at least one transceiver, the combined transport block in a Physical Downlink Shared Channel (PDSCH) communication.

Aspect 15: The base station of aspect 14, wherein the at least one processor is configured to: determine at least one node that is part of the at least one route associated with the first UE, wherein the combined transport block is transmitted to the at least one node.

Aspect 16: The base station of aspect 15, wherein the at least one processor is configured to: receive, from the at least one node via the at least one transceiver, a feedback message with an indication of a failure to decode at least one data component from the plurality of components; and transmit, to the at least one node via the at least one transceiver, a copy of the at least one data component.

Aspect 17: The base station of any of aspects 14 to 16, wherein the plurality of components includes at least one downlink control information (DCI) component.

Aspect 18: The base station of any of Aspects 14 to 17, wherein the at least one processor is configured to: determine a control component and a data component associated with the first UE, wherein the control component and the data component are included in the plurality of components in the combined transport block.

Aspect 19: The base station of any of Aspects 14 to 18, wherein the combined transport block includes at least one header, the at least one header including at least one of a destination identifier, the routing information, a range identification, and a transmission resource allocation.

Aspect 20: The base station of aspect 19, wherein the at least one header comprises a first header and a second header, wherein the second header is encoded with at least one component from the plurality of components.

Aspect 21: A method of performing any of the operations of aspects 1 to 20.

Aspect 22: A computer-readable storage medium storing instructions that, when executed, cause one or more processors to perform any of the operations of aspects 1 to 20.

Aspect 23: An apparatus comprising means for performing any of the operations of aspects 1 to 20.

What is claimed is:

1. A wireless communication relay device, comprising:

at least one memory;

at least one transceiver; and at least one processor coupled to the at least one memory and the at least one transceiver, the at least one processor configured to:

receive, via the at least one transceiver, a first Physical Downlink Shared Channel (PDSCH) communication;

determine, from the first PDSCH communication, a first combined transport block including a first header and a plurality of components, the plurality of components including a first control component associated with a first user equipment (UE) and the first header including routing information associated with the first control component;

generate a first transport block that includes the first control component;

determine, based on the routing information associated with the first control component, at least one node that is part of a route to the first UE; and transmit, via the at least one transceiver, the first transport block to the at least one node.

2. The wireless communication relay device of claim 1, wherein the first transport block comprises a Physical Downlink Control Channel (PDCCH) communication that is transmitted to the first UE.

3. The wireless communication relay device of claim 1, wherein the at least one processor is further configured to:

generate a second combined transport block that includes the first control component; and transmit, via the at least one transceiver, a second PDSCH communication that includes the second combined transport block to at least one node that is part of the route to the first UE, wherein the second combined transport block comprises control information for transmitting the first control component to the first UE.

4. The wireless communication relay device of claim 1, wherein to transmit the first transport block the at least one processor is configured to broadcast, via the at least one transceiver, the first transport block to a plurality of nodes.

5. The wireless communication relay device of claim 1, wherein the first transport block comprises a second PDSCH communication that is transmitted to the at least one node.

6. The wireless communication relay device of claim 1, wherein at least one of the plurality of components comprises a Downlink Control Information (DCI) component.

7. The wireless communication relay device of claim 1, wherein the plurality of components includes a first data component that is associated with the first UE and is encoded separately from the first control component.

8. The wireless communication relay device of claim 7, wherein the at least one processor is further configured to:

generate a second transport block that includes the first data component;

generate a second combined transport block that includes the first transport block and the second transport block; and transmit, via the at least one transceiver, the second combined transport block.

9. The wireless communication relay device of claim 7, wherein the at least one processor is further configured to:

determine whether the first data component can be decoded; and in response to a determination that the first data component cannot be decoded, transmit, via the at least one transceiver, a feedback message to a base station requesting retransmission of the first data component.

10. The wireless communication relay device of claim 1, wherein the first header further includes at least one of a destination identifier, a routing information, a range identification, or a transmission resource allocation.

11. The wireless communication relay device of claim 10, wherein the first combined transport block further includes a second header, wherein the second header is encoded with the first control component.

12. The wireless communication relay device of claim 10, wherein the first header corresponds to a first component from the plurality of components, the first component including a plurality of sub-components corresponding to a plurality of UEs.

13. A method of wireless communication performed by a relay device, the method comprising:

receiving a first Physical Downlink Shared Channel (PDSCH) communication;

determining, from the first PDSCH communication, a first combined transport block including a first header and a plurality of components, the plurality of components including a first control component associated with a first user equipment (UE) and the first header including routing information associated with the first control component;

generating a first transport block that includes the first control component;

determine, based on the routing information associated with the first control component, at least one node that is part of a route to the first UE; and transmitting the first transport block to the at least one node.

14. The method of claim 13, wherein the first transport block comprises control information for transmitting the first control component to the first UE.

15. The method of claim 13, wherein the first header further includes at least one of a destination identifier, a range identification, or a transmission resource allocation.

16. The method of claim 15, wherein the first combined transport block further includes a second header, wherein the second header is encoded with the first control component.

17. The method of claim 15, wherein the first header corresponds to a first component from the plurality of components, the first component including a plurality of sub-components corresponding to a plurality of UEs.

18. A wireless communication base station, comprising:

at least one memory;

at least one transceiver; and at least one processor coupled to the at least one memory and the at least one transceiver, the at least one processor configured to:

generate a combined transport block including a plurality of components and routing information indicating at least one route associated with a first user equipment (UE);

determine a first header, a first control component, and a first data component associated with the first UE, the first header including routing information associated with the first control component and indicating at least one node that is part of a route to the first UE, wherein the control component and the data component are included in the plurality of components in the combined transport block, and wherein the first header is included in a plurality of headers in the combined transport block; and transmit, via the at least one transceiver, the combined transport block in a Physical Downlink Shared Channel (PDSCH) communication for receipt by the first UE.

19. The base station of claim 18, wherein the at least one processor is further configured to:

determine the at least one node that is part of the route to the first UE, wherein the combined transport block is transmitted to the at least one node.

20. The base station of claim 19, wherein the at least one processor is further configured to:

receive, from the at least one node via the at least one transceiver, a feedback message with an indication of a failure to decode the first data component associated with the first UE; and transmit, to the at least one node via the at least one transceiver, a copy of the at least one data component.

21. The base station of claim 18, wherein the plurality of components includes at least one downlink control information (DCI) component.

22. The base station of claim 18, wherein the first header further includes at least one of a destination identifier, a range identification, or a transmission resource allocation.

23. The base station of claim 22, wherein the combined transport block further includes a second header, wherein the second header is encoded with at least one component from the plurality of components.

24. A method of wireless communication performed by a base station, the method comprising:

generating a combined transport block including a plurality of components and routing information indicating at least one route associated with a first user equipment (UE);

determining a first header, a first control component, and a first data component associated with the first UE, the first header including routing information associated with the first control component and indicating at least one node that is part of a route to the first UE, wherein the control component and the data component are included in the plurality of components in the combined transport block, and wherein the first header is included in a plurality of headers in the combined transport block; and transmitting the combined transport block in a Physical Downlink Shared Channel (PDSCH) communication for receipt by the first UE.

25. The method of claim 24, further comprising:

determining the at least one node that is part of the route to the first UE, wherein the combined transport block is transmitted to the at least one node.

26. The method of claim 25, further comprising:

receiving, from the at least one node, a feedback message with an indication of a failure to decode the first data component associated with the first UE; and transmitting, to the at least one node, a copy of the at least one data component.

27. The method of claim 24, wherein the first header further includes at least one of a destination identifier a range identification, or a transmission resource allocation.

28. The method of claim 13, wherein the first transport block comprises a Physical Downlink Control Channel (PDCCH) communication that is transmitted to the first UE.

29. The method of claim 13, further comprising:

generating a second combined transport block that includes the first control component; and transmitting a second PDSCH communication that includes the second combined transport block to at least one node that is part of a route to the first UE, wherein the second combined transport block comprises control information for transmitting the first control component to the first UE.

* * * * *